3,772,213
PREPARATION OF A CATALYTIC COMPOSITE CONTAINING GERMANIUM AND PLATINUM
Roy T. Mitsche, Island Lake, and Frederick C. Wilhelm, Arlington Heights, Ill., assignors to Universal Oil Products Company, Des Plaines, Ill.
No Drawing. Continuation-in-part of abandoned application Ser. No. 861,456, Sept. 26, 1969. This application Sept. 4, 1970, Ser. No. 69,895
Int. Cl. B01j 11/12
U.S. Cl. 252—466 PT
14 Claims

ABSTRACT OF THE DISCLOSURE

A platinum group component and a germanium component are uniformly dispersed throughout a porous high surface area carrier material by the steps of: first, mixing germanium tetrachloride with anhydrous alcohol to form a solution thereof; second, treating the resulting solution to establish an equilibrium condition therein; third, admixing the resulting treated solution with an aqueous solution of a water-soluble, decomposable compound of a platinum group metal to form a precipitate-free impregnation solution; fourth, contacting the resulting impregnation solution with a porous, high surface area carrier material at impregnation conditions; and finally drying and calcining the resulting impregnated carrier material. Key feature of this method of preparation involves treatment of the solution of germanium tetrachloride and alcohol to insure the formation of a precipitate-free impregnation solution, thereby enabling both the platinum group component and the germanium component to be simultaneously added to the carrier material in a manner providing a uniform dispersion of both components in the carrier material.

CROSS-REFERENCES TO RELATED APPLICATIONS

This application is a continuation-in-part of our prior copending application Ser. No. 861,456 filed Sept. 26, 1969, now abandoned.

DISCLOSURE

The subject of the present invention is a method of preparing a catalytic composite comprising a platinum group component and a germanium component uniformly dispersed throughout a porous, high surface area carrier material. In a narrower aspect, the present invention concerns a method of preparation of catalytic composite comprising a combination of a platinum group component, a germanium component, and a chlorine component with a porous, high surface area carrier material wherein a high dispersion in the carrier material of both the platinum group component and the germanium component is achieved.

In the art of preparing catalytic composites it is typically required that a catalytically active component be combined with a carrier material or support material which may or may not be active for the particular reaction or set of reactions of interest. It is often additionally required that the catalytically active component be uniformly dispersed or distributed throughout the carrier material. The expression "uniformly dispersed" is generally understood to mean that the concentration of the particular component in the carrier material is approximately the same in any divisible portion thereof. This expression is usually employed to distinguish the situation encountered when the catalytically active component is concentrated in a particular area of the composite; for example, some catalytic composites of the prior art employ so-called surface impregnation techniques to achieve a high concentration of one or more of the catalytically active components on the surface of the carrier material, with relatively little of the impregnated component penetrating to the inner areas of the carrier material.

Heretofore, catalysts for use in the hydrocarbon conversion art have been relatively simple formulations typically involving one or more catalytically active elements selected from the transition metals of the Periodic Table combined with a porous carrier material. For instance, a typical formulation would involve one or more catalytically active elements from group VIII or VI-B of the Periodic Table combined with a refractory inorganic oxide such as alumina or silica-alumina.

Responsive to the ever-increasing demands of petroleum refining and chemical technologists for increased efficiency in their catalytic conversion processes, the catalyst preparation art has recently been more frequently concerned with multi-component catalytic composites involving some rather unusual catalytic ingredients which have not heretofore been widely used in commercial petroleum or chemical processes. One of these estoteric ingredients is germanium. Germanium is an element of Group IV-A of the Periodic Table which has relatively unusual chemical characteristics because it is in the same family as carbon and silicon, which are non-metals, and as tin and lead, which are metals. More precisely, germanium is a non-transition element falling on the border between the non-metals and metals of Group IV-A. Germanium has recently been found to possess a rather remarkable capability to interact with a platinum group component contained in a porous carrier material. The resulting dual-function catalytic composite has some rather remarkable properties when it is utilized in hydrocarbon conversion processes such as reforming, hydrocracking, isomerization, etc., that have traditionally used these types of catalysts. However, it has been determined that the acquisition of this beneficial effect of germanium on platinum-containing composites is dependent on the distribution of the germanium in the carrier material. This is, it is essential that the germanium component be uniformly dispersed in the composite.

For a number of reasons such as ready availability of suitable porous carrier materials, ease and convenience of manufacture, disinclination to incorporate catalytically active components during manufacture of carrier material and economic factors, it is generally desired to produce a catalytic compositive via an impregnation procedure wherein the catalytically active components are joined with a suitable preformed support in a one-step procedure. When an attempt is made to combine a germanium component with a high surface area carrier material via a standard impregnation procedure, substantially difficulty is typically encountered because of the lack of germanium compounds suitable for use in impregnation solutions when a uniform dispersion of the germanium in the resulting composite is required. For example, the prior art has in the main utilized germanium tetrachloride dispersed in strong solutions of hydrochloric acid to effect impregnation of germanium into a suitable carrier material. This procedure results in the precipitation of germanium dioxide on the surface of the carrier material with resulting uneven distribution of germanium in the final composite. In addition, for some common carrier materials (e.g. alumina), the acidity level in the impregnation solution is sufficient to cause a substantial adverse change in the characteristics of the carrier material.

In order to circumvent the problems encountered with the use of germanium tetrachloride in strong hydrochloric acid solutions, a number of solutions of this compound in other solvents have been investigated. One promising impregnation solution involves germanium tetrachloride dissolved in alcohol. However, in the preparation of a dual-function catalyst containing both a platinum group component and a germanium component, it is preferred to simultaneously impregnate the germanium component and the platinum group component. Thus, in order to accomplish this preferred objective, it is necessary to add to the germanium-containing solution suitable ingredients for impregnating a platinum group metal. It is established in the art of impregnating platinum group components that a preferred impregnation solution involves an aqueous solution of a soluble, decomposable compound of the platinum group metal; for example, it is typically desired to use an aqueous solution of chloroplatinic acid. Despite the solubility of germanium tetrachloride in alcohol, we have observed that the admixture of this latter solution with an aqueous solution containing a decomposable compound of a platinum group metal result in the precipitation of germanium dioxide unless a hereinafter described pretreatment procedure is followed. Apparently, what happens is that the germanium tetrachloride, on contact with the water contained in the platinum group metal impregnation solution, tends to rapidly hydrolyze to germanium dioxide, with resulting precipitation of solid germanium dioxide. If an attempt is then made to impregnate a carrier material with this precipitate-containing mixture, the resulting catalytic composite contains a non-uniform distribution of germanium and the beneficial interaction of germanium with the platinum group component is not obtained. In some very limited cases, the germanium component can be redistributed in the composite by heat treatment above 710° C., but this procedure can typically result in an unacceptable marked decrease in the surface area of the resulting composite.

Accordingly, the problem addressed by the present invention involves the use of a solution of germanium tetrachloride in conjunction with an aqueous solution of a soluble, decomposable compound of a platinum group metal to simultaneously impregnate a porous carrier material in a manner resulting in a uniform distribution of both the platinum group component and the germanium component in the resulting composite.

We have now, quite unexpectedly, found a method for using an alcohol solution of germanium tetrachloride and an aqueous solution of a platinum group compound in a simultaneous impregnation procedure which results in a uniform distribution of both the platinum and germanium components in the resulting composite. Key features associated with our procedure involves the use of anhydrous alcohol to dissolve the germanium tetrachloride and the treatment of the resulting solution of germanium tetrachloride in alcohol to establish equilibrium therein before this solution is admixed with the platinum group metal impregnation solution. The use of anhydrous alcohol coupled with this preliminary treatment step causes the germanium species in the alcohol solution to be modified to the extent that when it is admixed with the aqueous platinum impregnation solution, no precipitate is formed. The resulting clear mixture of the solutions is then easily utilized to achieve a uniform dispersion of both the germanium component and the platinum group component in the porous high surface area carrier material as will be explained hereinafter.

Accordingly, it is an object of the present invention to provide a convenient and facile method for simultaneously impregnating and for uniformly distributing a germanium component and a platinum group component throughout a porous high surface area carrier material. Another object is to provide a convenient method for uniformly distributing a germanium component throughout a porous high surface area carrier material without resorting to excessively high heat treatments to redistribute the germanium crystallites and without damaging the carrier material, while simultaneously adding a platinum group component to the carrier material.

In brief summary, the present invention is, in one embodiment, a method of preparing a catalytic composite comprising a platinum group component and a germanium component uniformly dispersed throughout a porous carrier material. In the first step of the method, germanium tetrachloride is dissolved in anhydrous alcohol to form a solution thereof. In the next step, the resulting solution is treated to establish an equilibrium condition therein. Thereafter, the resulting treated solution is admixed with an aqueous solution of a water-soluble decomposable compound of a platinum group metal to form a precipitate-free impregnation solution. In the next step, a high surface area porous carrier material is contacted with the resulting impregnation solution at impregnation conditions. In the final step, the resulting impregnated carrier material is dried and calcined to produce a catalytic composite having a platinum group component and a germanium component uniformly dispersed therein.

In a preferred embodiment, the present invention involves a method of preparing a catalytic composite comprising a combination of a platinum component, a germanium component and a chlorine component with an alumina carrier material. In the first step, germanium tetrachloride is admixed with anhydrous alcohol to form a solution thereof. Thereafter, the resulting solution is treated to establish an equilibrium condition therein. The resulting treated solution is then admixed with water, hydrochloric acid, and a water-soluble, decomposable compound of a platinum metal to form a precipitate-free impregnation solution. In the next step, the resulting impregnation solution is contacted with a high surface area porous carrier material at impregnation conditions. In the final step, the resulting impregnated carrier material is dried and calcined to produce a catalytic composite having a platinum group component and a germanium component uniformly dispersed therein.

Other objects and embodiments of the present invention relate to details regarding the preferred ingredients contained in the catalytic composite prepared thereby, the conditions, procedures, and preferred reagents for use in each step thereof, and preferred uses for the resulting catalytic composites. These will be hereinafter described in the following detailed explanation of each of these facets of the present invention.

An indicated above, the first essential step of the present invention involves admixing germanium tetrachloride with anhydrous alcohol. It is a feature of the present invention that the alcohol used in this mixing step is anhydrous; that is, it contains less than 2 vol. percent water and preferably, less than 0.5 wt. percent. The reason for this last limitation is that the use of solutions of alcohol containing excess water cause the formation of a precipitate; for example, ethyl alcohol containing less thn 98% ethanol by volume, e.g. 95% ethanol, has been found to be unsatisfactory for the purpose of the present invention because it will form a precipitate of germanium dioxide on subsequent dilution with water resulting in maldistribution of the germanium component in the subsequently prepared composite. The amount of germanium tetrachloride, calculated as elemental germanium, in the alcohol solution is preferably selected from the range of about 10 to about 200 mg./ml. The conditions utilized during this step are not critical; and, in fact, ordinary conditions of temperature and pressure give excellent results.

Any suitable alcohol can be used in this mixing step provided that it is anhydrous and that the desired amount of germanium tetrachloride is miscible therewith. Based on our experiments, we have observed that aliphatic, monohydric alcohols having 1 to 10 carbon atoms give good results, with the degree of miscibility increasing with the number of carbon atoms in the alcohol. Considering such factors as cost, availability of reagents in anhydrous form, convenience, and performance of the resulting catalyst, we have found best results when the alcohol reagent is anhydrous ethanol or anhydrous isopropanol. Because of the tax problems associated with the use of anhydrous ethanol, generally the preferred reagent is anhydrous isopropanol.

After the solution of germanium tetrachloride and anhydrous alcohol is formed, it is, in accordance with the present invention, treated to establish an equilibrium condition therein. It is intended to include within the scope of this step the following modes of operation: first, where the solution is merely aged at the same conditions employed when it was formed for a period of time sufficient to establish an equlibrium condition therein; second, a mode of operation wherein the solution is heated to a relatively high temperature, generally about 10 to about 100° C. higher than the temperature utilized during its formation until an equilibrium condition is established therein; and a mode of operation which includes a combination of the first two modes wherein the solution is both heated and aged. As indicated, the duration of this treatment step is determined by reference to the establishment of equilibrium conditions in the solution. It is believed that this involves a complex reaction between the germanium tetrachloride and the ethanol to form a mixture of germanium monoethoxide trichloride, germanium diethoxide, dichloride, germanium triethoxide monochloride and, perhaps, germanium tetraethoxide with formation of HCl. A convenient criterion to determine when an equilibrium condition is established in this solution involves monitoring the rate of formation of HCl in the solution. When this last parameter essentially reaches zero, equilibrium is established. In general, for a solution containing a relatively high amount of tetrachloride (i.e. about 25 to about 200 mg./ml.), excellent results are obtained by aging the solutions at room temperature for a period of about 1 to about 4 days or more. Similarly, for solutions in this last range, good results have been observed by heating the solution to a temperature of about 70° C. for about 1 to about 5 hours until no further evolution of HCl gas was observed. It is, of course, to be noted that the duration of this treatment step is a pronounced function of the concentration level of the germanium tetrachloride in the alcohol solution with relatively concentrated solutions requiring a longer period or more severe conditions to establish equilibrium while, on the other hand, less concentrated solutions require substantially smaller periods of time and less severe conditions.

Following this treatment step, the resulting treated solution is admixed with an aqueous solution of a water-soluble decomposable compound of a platinum group metal to form an impregnation solution. In general, best results are obtained with an aqueous solution of chloroplatinic acid, although other water-soluble compounds of platinum group metals may be utilized to form this impregnation solution and include: ammonium chloroplatinate, bromoplatinic acid, platinum dichloride, platinum tetrachloride, platinum dichlorocarbonyl dichloride, dinitrodiaminoplatinum, palladium, dichloride, palladium dichloride dihydrate, palladium nitrate, palladium sulfate, and the like compounds. A feature of the present invention is the fact that because of the use of anhydrous alcohol and the hereinbefore described treatment of the germanium tetrachloride solution, the resulting impregnation solution is precipitate-free. This result is in sharp contrast to the situation encountered when an untreated solution of germanium tetrachloride in alcohol is added to aqueous solution containing a platinum group metal. Here immediate precipitation of germanium dioxide is noted with consequent maldistribution of the germanium component in the subsequently prepared composite.

An additional preferred component of this impregnation solution is an acid which may be any suitable mineral and/or organic acid which is sufficient to establish and maintain the pH of the impregnation solution in the range of about 1 to about 7. Preferred mineral acids include hydrogen fluoride, hydrogen chloride, hydrogen bromide, nitric acid, and the like acids. Best results are ordinarily achieved when hydrochloric acid is utilized in an amount corresponding to about 0.5 to about 4 wt. percent of the carrier material which is subsequently impregnated. The function of the acid in the impregnation solution is to maintain both the platinum group component and the germanium component of the solution in an ionized state wherein they have excellent mobility, thereby allowing them to uniformly disperse throughout the impregnated material.

Thereafter the resulting impregnation solution is contacted with a high surface area, porous carrier material in an impregnation step. The carrier material is a porous, adsorptive, high surface area support having a surface area of about 25 to about 200 m.²/g. Suitable materials are: (1) activated carbon, coke, or charcoal; (2) silica or silica gel, clays and silicates including those synthetically prepared and naturally occurring, which may or may not be acid treated; for example, Attapulgus clay, china clay, diatomaceous earth, fuller's earth, kaolin, kieselguhr, pumice, etc.; (3) ceramics, porcelain, crushed firebrick, and bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) crystalline aluminosilicates such as naturally occurring or synthetically prepared mordenite and/or faujasite, either in the hydrogen form or in a form which has been treated with multivalent cations; and, (6) combinations of elements selected from one or more of these groups. The preferred porous carrier materials for use in the present invention are refractory inorganic oxides with best results obtained with an alumina carrier material. Suitable alumina materials are the crystalline aluminas known as the gamma-, eta-, and theta-alumina, with gamma- or eta-alumina giving best results. In addition, in some embodiments the alumina carrier material may contain minor proportions of other well known refractory inorganic oxides such as silica, zirconia, magnesia, etc.; however, the preferred carrier material is substantially pure gamma- or eta-alumina. Preferred carrier materials have an apparent bulk density of about 0.3 to about 0.7 g./cc. and surface area characteristics such that the average pore diameter is about 20 to 300 angstroms, the pore volume is about 0.1 to about1 ml./g. and the surface area is about 100 to about 500 m.²/g. In general, best results are typically obtained with a gamma-alumina carrier material which is used in the form of spherical particles having: a relatively small diameter (i.e., typically about 1/16 inch), an apparent bulk density of about 0.5 g./cc., a pore volume of about 0.4 ml./g. and a surface area of about 175 m.²/g.

The conditions utilized in this impregnation step are the conventional conditions known in the art and generallyinclude a temperature of about 50 to about 100° F. and a contact time of about 0.25 to about 5, or more, hours. It is a good practice to vigorously agitate the mixture of carrier material and impregnation solution in order to effect intimate contact therebetween. Similarly, it is preferred to dilute the impregnation solution to a volume which is substantially in excess with the volume of the carrier material which is impregnated. Use of a volume ration of impregnation solution to carrier material of at least 1.5:1 and preferably about 2:1 to about 10:1 or more is generally preferred. The carrier material is preferably relatively small in size in order to promote good contact with the impregnation solution with best results obtained with 1/16 inch spherical particles.

Although the platinum group component of the subject composite is preferably platinum, the scope of the present invention is intended to include other platinum group metals such as palladium, rhodium, ruthenium, osmium, and iridium. The platinum group component may exist within the final catalyst composite as a compound such as an oxide, sulfide, halide etc., or as an elemental metal, with the latter state being preferred. The amount of the platinum group component present in the final composite is generally quite small and typically comprises about 0.01 to about 2 wt. percent of the final composite, calculated on an elemental basis. Excellent results are obtained when the catalyst contains about 0.05 to about 1 wt. percent of the platinum group metal.

In addition to the platinum group component, it is preferred that the composite prepared by the method of the present invention also contain a halogen component. Although the precise form of the chemistry of the association of the halogen component with the carrier material and/or other components of the composite is not entirely known, it is customary in the art to refer to the halogen component as being combined with the carrier material or other ingredients of the catalytic composite. This combined chloride may be either fluorine, chlorine, iodine, bromine, or mixtures thereof. Of these the chlorine is particularly preferred especially in view of the fact that the impregnation solution preferably contains substantial amounts of chloride in the form of hydrogen chloride and chloroplatinic acid. The halogen component may be added to the carrier material in any suitable manner either during preparation of the carrier material or before or after the addition of the other catalytic components. Despite the fact that the impregnation solution preferably contains substantial amounts of chloride, it is generally preferred to adjust the chloride level in the composite during a subsequent calcination step as explained below. The halogen component is combined with the carrier material in amounts sufficient to result in the final composite containing about 0.5 to about 3.5 wt. percent, and preferably about 0.5 to about 3.5 wt. percent, and preferably about 0.6 to about 1.2 wt. percent of halogen, calculated on an elemental basis.

The halogen component is utilized in the subject composite for two purposes: one involves the traditional enhancement of the acidic function of the resulting composite; the other involves the achievement and maintenance of a uniform distribution of theh germanium component in the carrier material. One of the principal effects of incorporating the halogen component in the composite is that it acts to hold or fix the germanium component in a highly dispersed state where it is resistant to the subsequent reduction conditions. As previously indicated, a preferred mode of operation when the high surface area carrier material is alumina is to add hydrochloric acid to the germanium impregnation solution in an amount corresponding to about 0.5 to about 4 wt. percent of the alumina which is to be impregnated.

In summary, a preferred embodiment of the impregnation step of the present invention involves the utilization of an impregnation solution containing the alcohol solution of germanium tetrachloride, a soluble, decomposable compound of a platinum group metal, such as chloroplatinic acid, and hydrochloric acid. The amounts of the ingredients present in this impregnation solution are selected to result in a final catalytic composite containing the desired quantity of the components. These final quantities were specified with respect to the halogen component and the platinum group component.

Regarding the amount of the germanium component contained in the resulting catalytic composite, it typically comprises about 0.01 to about 5 wt. percent of the final composite calculated on an elemental basis, with best results obtained when this component comprises about 0.05 to about 2 wt. percent of the resulting composite. In general, it is preferred that this germanium component be maintained in an oxidation state above that of the elemental metal. That is, the germanium component preferably exists in the final catalytic composite in either the +2 or +4 oxidation state. It is a particular advantage of the preparation method of the present invention that it enables the achievement and maintenance of the germanium component in this state.

Regardless of the details of how the components of the composite are combined with the porous carrier material, the final catalyst generally will be dried at a temperature of about 200 to about 600° F. for a period of from about 2 to about 24 hours or more, and finally calcined or oxidized at a temperature of about 700° to about 1100° F. in an air atmosphere for a period of about 0.5 to about 10 hours in order to convert the metallic components substantially to the oxide form. Best results are generally obtained when the halogen content of the catalyst is adjusted during the calcination step by including a halogen or a halogen-containing compound in the air atmosphere utilized. In particular when the halogen component of the catalyst is chlorine, it is preferred to use a mole ratio of $H_2O$ to HCl of about 20:1 to about 100:1 during at least a portion of the calcination step in order to adjust the final chlorine content of the catalyst to a range of about 0.6 to about 1.2 wt. percent.

It is preferred that the resultant calcined catalytic composite be dried by any conventional method and then subjected to a substantially water-free reduction step prior to its use in the conversion of hydrocarbons. This step is designed to insure a uniform and finely divided dispersion of the metallic components throughout the carrier material. Preferably, substantially pure and dry hydrogen (i.e., less than 20 vol. p.p.m. $H_2O$) is used as the reducing agent in this step. The reducing agent is contacted with the calcined catalyst at conditions including a temperature of about 800° F. to about 1100° F. selected to reduce the platinum group component to the metallic state while maintaining the germanium component in positive oxidation state. This reduction step may be performed in situ as part of a start-up sequence if precautions are taken to predry the plant to a substantially water-free state and if substantially water-free hydrogen is used. The duration of this step is preferably less than two hours, and, more typically, about one hour.

The resulting reduced catalytic composite may, in some cases, be beneficially subjected to a presulfiding step designed to incorporate in the catalytic composite from about 0.05 to about 0.5 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1000° F. It is generally a good practice to perform this presulfiding step under substantially water-free conditions.

The resulting catalytic composite finds utility in the broad range of hydrocarbon conversion reactions which have traditionally utilized dual-function hydrocarbon conversion catalysts containing a platinum group metal. Suitable charge stocks, reaction conditions, methods of use, and mechanics of use for all of these hydrocarbon conversion processes are well known to those skilled in the art and will not be repeated here. It is sufficient to note that the catalytic composite prepared by the method of the present invention can be utilized in the conversion of hydrocarbons according to any of the methods and techniques which are known to those skilled in the art.

The following examples are given to illustrate further the preparation of a preferred catalytic composite by the method of the present invention. It is understood that these examples are given for the sole purpose of illustrating a preferred embodiment of the present invention and a preferred mode of using the composite produced thereby.

Example I

An alumina carrier material comprising 1/16 inch spheres was prepared by: forming an aluminum hydroxyl chloride sol by dissolving substantially pure aluminum pellets in a hydrochloric acid solution, adding hexamethylenetetramine to the resulting sol, gelling the resulting solution by dropping it into an oil bath to form spherical particles of alumina hydrogel. The resulting hydrogel particles were then aged and washed with an ammoniacal solution and finally dried and calcined at an elevated temperature to form spherical particles of gamma-alumina containing about 0.3 wt. percent combined chloride. Additional details as to this method of preparing the preferred carrier material are given in the teachings of U.S. Pat. No. 2,620,314.

Germanium tetrachloride was then dissolved in anhydrous ethanol to form a solution. The anhydrous ethanol contained less than 0.5 vol. percent water. The amount of germanium tetrachloride added was sufficient to result in a final solution containing about 33 mg./ml. of germanium.

The resulting solution was then treated by aging for four days at room temperature in order to establish an equilibrium condition therein.

An amount of the resulting treated germanium solution, calculated to result in a final composite containing 0.25 wt. percent germanium, was then mixed with an amount of an aqueous solution of chloroplatinic acid calculated to result in a final composite containing 0.375 wt. percent platinum. In addition, hydrogen chloride was added to the resulting mixture in an amount corresponding to about 2 wt. percent of the alumina carrier material which was subsequently impregnated. The resulting impregnation solution was precipitate-free.

Thereafter, the particles of the alumina carrier material were contacted with the resulting impregnation solution with constant agitation. The volume of the impregnation solution was approximately two times the volume of the alumina particles utilized. The impregnation mixture was maintained in contact with the alumina particles for a period of about ½ hour at a temperature of about 70° F. Thereafter, the temperature of the mixture of alumina particles and impregnation solution was raised to about 300° F. and the excess solution was evaporated. This drying step took about 1 hour. The resulting dried particles were then subjected to a calcination treatment in an air atmosphere at about 975° F. for about 1 hour. The calcined spheres were then contacted with an air stream containing $H_2O$ and HCl in a mole ratio of about 40:1 for about 4 hours at 975° F. in order to adjust the halogen content of the composite to a value of about 0.90 wt. percent.

A portion of the resulting catalyst particles was then analyzed and found to contain, on an elemental basis, about 0.375 wt. percent platinum, about 0.25 wt. percent germanium, and about 0.85 wt. percent chloride. The analysis also showed both the germanium and platinum components to be uniformly distributed on the catalyst particles ;that is, the concentration of these materials at the center of the particles was substantially the same as that measured at the surface of these particles.

Thereafter, the catalyst particles were subjected to a dry pre-reduction treatment by contacting them with a substantially pure hydrogen stream containing less than 20 vol. p.p.m. $H_2O$ at a temperature of about 1000° F., a pressure slightly above atmospheric and a flow rate of the hydrogen stream through the catalyst particles corresponding to a gas hourly space velocity of about 720 hr.$^{-1}$. This pre-reduction step was for a duration of about 1 hour.

The resulting catalytic composite was found to have remarkable properties of activity, selectivity, and stability when it was utilized in the conversion of hydrocarbons. In particular, it was found to give superior results when it was utilized in a process for reforming a gasoline fraction at high severity conditions including a relatively low pressure of 50 to about 350 p.s.i.g.

Example II

In order to compare the catalytic composite prepared by the method of the present invention with a high quality reforming catalyst of the prior art, a comparison test was made between the catalyst prepared in Example I and a control catalyst comprising a combination of a platinum component and a halogen component with a gamma-alumina carrier material. This control catalyst contained no germanium component, but, except for this, it was prepared in a manner analogous to that described in Example I. That is, the control catalyst was a combination of platinum and chlorine with a gamma-alumina carrier material which was prepared by a manner analogous to that given in Example I except for the inclusion of the germanium component and contained, on an elemental basis, about 0.75 wt. percent platinum and about 0.85 wt. percent chlorine.

These catalysts were then separately subjected to a high stress evaluation test designed to determine their relative activity, selectivity, and stability for the reforming of a gasoline charge stock. In all tests the same charge stock was utilized, its characteristics are given in Table I.

TABLE I—ANALYSIS OF HEAVY KUWAIT NAPHTHA

| | |
|---|---:|
| API gravity at 60° F. | 60.4 |
| Initial boiling point, ° F. | 184 |
| 10% boiling point, ° F. | 205 |
| 50% boiling point, ° F. | 256 |
| 90% boiling point, ° F. | 321 |
| End boiling point, ° F. | 360 |
| Sulfur, wt. p.p.m. | 0.5 |
| Nitrogen, wt. p.p.m. | 0.1 |
| Aromatic, vol. percent | 8 |
| Paraffins, vol. percent | 71 |
| Naphthenes, vol. percent | 21 |
| Water, p.p.m. | 5.9 |
| Octane no., F–1 clear | 40.0 |

This test was specifically designed to determine in a very short time period whether the catalyst being evaluated has superior characteristics for the reforming process. It consists of six periods comprising a 12 hour line-out period followed by a 12 hour test period run at a constant temperature during which time a $C_5+$ product reformate is collected. It was performed in a laboratory scale reforming plant comprising a reactor containing the catalyst, hydrogen separation zone, a debutanizer column, suitable heating, pumping, and condensing means, etc.

In this plant, a hydrogen recycle stream and the charge stock are commingled and heated to the desired conversion temperature. The resulting mixture is then passed downflow into a reactor containing the catalyst as a fixed bed. An effluent stream is then withdrawn from the bottom of the reactor, cooled to about 55° F., and passed to the separating zone wherein a hydrogen-rich gaseous phase separates from a liquid phase. A portion of the gaseous phase is continuously passed through a high surface area sodium scrubber and the resulting substantially water-free hydrogen stream recycled to the reactor in order to supply hydrogen for the reaction and the excess over that needed for plant pressure is recovered as excess separator gas. Moreover, the liquid phase from the separating zone is withdrawn therefrom and passed to the debutanizer column wherein light ends are taken overhead as debutanizer gas and a $C_5+$ reformate stream recovered as bottoms.

Conditions utilized in this test are: an outlet reactor pressure of 300 p.s.i.g., a liquid hourly space velocity of 3 hr.$^{-1}$ and and inlet reactor temperature which was periodically adjusted throughout the test in order to achieve and maintain a $C_5+$ target octane of 100 F–1 clear.

This test is designed to quickly and efficiently yield information on the activity, selectivity and stability characteristics of the catalyst being tested. The conditions utilized are selected on the basis of experience to yield the maximum amount of information on the capability of the catalyst being tested to respond to a high severity operation.

The results of the separate tests performed on the catalyst of the present invention and the control catalyst are presented for each test period in Table II in terms of inlet temperature to the reactor in ° F., $C_5+$ yield on a vol. percent of feed basis, net excess separator gas in standard cubic feet per barrel of charge (s.c.f./bbl.), debutanizer overhead gas in standard cubic feet per barrel, and the ratio of the debutanizer gas make to the total gas make.

In addition, the respective catalysts were analyzed for carbon content after the completion of test. The results showed that the catalyst of the present invention contained 2.73 wt. percent carbon which was in marked contrast to the 7.84 wt. percent carbon which was found on the control catalyst. These results evidence an additional advantage associated with the catalysts prepared by the present invention: the capability to suppress the rate of deposition of carbonaceous materials thereon during the course of the reforming reaction.

TABLE II.—RESULTS OF ACCELERATED REFORMING TESTS

| Period number | Temp., ° F. | $C_5+$vol., percent yield | Separator gas, s.c.f./bbl. | Debutanizer gas, s.c.f./bbl. | Debut gas total gas ratio |
|---|---|---|---|---|---|
| Catalyst prepared by the present invention, .375 wt. percent Pt, 0.25 wt. percent Ge and .85 wt. percent Cl | | | | | |
| 1 | 1,013.5 | 72.0 | 1,349 | 243 | .153 |
| 2 | 1,020.0 | 73.2 | 1,353 | 225 | .143 |
| 3 | 1,024.5 | 72.7 | 1,355 | 233 | .147 |
| 4 | 1,027.0 | 72.2 | 1,349 | 237 | .149 |
| 5 | 1,029.5 | 71.9 | 1,329 | 232 | .149 |
| 6 | 1,034.5 | 71.9 | 1,348 | 243 | .153 |
| Control catalyst, .75 wt. percent Pt. and .85 wt. percent Cl | | | | | |
| 1 | | | | | |
| 2 | 1,035.5 | 68.7 | 1,287 | 267 | .172 |
| 3 | | | | | |
| 4 | 1,051.5 | 64.9 | 1,163 | 353 | .233 |
| 5 | | | | | |
| 6 | 1,072.0 | 59.5 | 1,005 | 436 | .302 |

Referring now to the results of the separate tests perfomed in Table II, it is evident that the effect of the germanium component on the catalyst is to substantially promote the platinum metal component and to enable a catalyst containing less platinum to outperform a catalyst containing a substantially greater amount of platinum. That is to say, the catalyst prepared by the method of the present invention is sharply superior to the control catalyst in both activity and selectivity. A good measure of activity for a reforming catalyst is temperature required to make octane, all other conditions being the same; on this basis, the catalyst of the present invention was materially more active than the control catalyst throughout the test. However, activity is only half of the story: activity must be coupled with selectivity to demonstrate superiority. Selectivity is measured directly by reference to $C_5+$ yield and indirectly by reference to separator gas make, which is roughly proportional to net hydrogen make which in turn is a product of the preferred upgrading reactions, and by reference to debutanizer gas make, which is a rough measure of undesired hydrocracking and should be minimized for a highly selective catalyst. Referring again to the data presented in Table II and using the selectivity criteria, it is manifest that the catalyst prepared by the method of the present invention is materially more selective than the control catalyst.

Likewise, good indications of stability are the rate of change of temperature required to make octane and rate of decline of $C_5+$ yield at octane. Applying these criteria to the data presented in Table II, it is apparent that the catalyst prepared by the present invention is significantly more stable than the control catalyst.

Example III

Germanium tetrachloride was added to anhydrous isopropanol (containing less than 0.1 wt. percent $H_2O$) in an amount selected to result in a solution containing 50 mg. of germanium per cc. The resulting germanium-containing solution was then aged at room temperature for 48 hours in order to establish an equilibrium condition therein. The resulting aged solution was then used to prepare a catalyst containing 0.375 platinum, 0.5 germanium and 0.85 chlorine combined with a gamma-alumina carrier material. The method of preparation was essentially the same as is given in Example I with the exception that the isopropanol solution was used and that the amount of germanium was increased from 0.25 to 0.5 wt. percent.

The resulting catalyst was then subjected to an accelerated reforming test which was identical to that described in Example II except for the conditions used. The conditions used with this catalyst were: a LHSV of 1.5 hr.$^{-1}$ a hydrogen to hydrocarbon mole ratio of about 4:1, a pressure of 100 p.s.i.g., and an inlet reactor temperature which was periodically adjusted to achieve a target octane of 102 F-1 clear.

The results of the test are presented in Table III in the same terms that the used in Table II.

TABLE III.—RESULTS OF ACCELERATED REFORMING TEST

| Period number | Temp., ° F. | Separator gas, s.c.f./bbl. | Debutanizer gas, s.c.f./bbl. | Debutanizer gas to total gas ratio |
|---|---|---|---|---|
| 1 | 971.5 | 1,767 | 54 | .030 |
| 2 | 981.5 | 1,802 | 69 | .037 |
| 3 | 992 | 1,817 | 70 | .037 |
| 4 | 997 | 1,755 | 67 | .037 |
| 5 | 1,003.5 | 1,739 | 74 | .041 |
| 6 | 1,012 | 1,728 | 78 | .043 |

Referring to data presented in Table III and using the criteria for activity and selectivity previously discussed in Example II, it can be ascertained that the present catalyst is an excellent catalyst for the forming process with superior activity, selectivity and stability characteristics. Accordingly, these results provide evidence of the capability of the instant catalyst preparation procedure to produce a superior catalyst in an embodiment where isopropanol is used as the alcohol reagent.

It is intended to cover by the following claims all changes and modifications of the above disclosure of the present invention which would be self-evident to those of ordinary skill in the catalyst-making art.

We claim as our invention:

1. A method of preparing a catalystic composite which comprises:
    (a) dissolving germanium tetrachloride in anhydrous alcohol;
    (b) aging the resultant solution at about room temperature for about 1 to about 4 days to establish an equilibrium condition in the solution;
    (c) then admixing the solution with an aqueous solution of a water-soluble, heat decomposable compound of a platinum group metal to form a precipitate-free impregnation solution;
    (d) contacting the resulting impregnation solution with a porous, high surface area carrier material at impregnation conditions; and thereafter
    (e) drying and calcining the resulting imprengated carrier material to produce the composite.

2. A method as defined in claim 1 wherein said porous carrier material is a refractory inorganic oxide.

3. A method as defined in claim 2 wherein said refractory inorganic oxide is alumina.

4. A method as defined in claim 1 wherein said aqueous soltuion utilized in step (c) contains hydrochloric acid in an amount corresponding ot about 0.5 to about 4 wt. percent of the carrier material which is impregnated in step (d).

5. A method as defined in claim 1 wherein said alcohol is a $C_1$ to $C_{10}$ alcohol.

6. A method as defined in claim 1 wherein said alcohol is ethanol.

7. A method as defined in claim 1 wherein said alcohol is isopropanol.

8. A method as defined in claim 1 wherein the catalytic composite resulting therefrom is, thereafter, subjected to contact with a substantially water-free hydrogen stream at reduction conditions selected to reduce the platinum group compound while maintaining the germanium compound in a positive oxidation state to produce a catalytic composite comprising a combination of a platinum group metal, oxidized germanium and chlorine with a porous carrier material.

9. A method as defined in claim 1 wherein said water-soluble, heat decomposable compound of platinum is chloroplatinic acid.

10. A method of preparing a catalystic composite which comprises:
(a) dissolving germanium tetrachloride in anhydrous alcohol;
(b) heating the resultant solution sufficiently to increase its temperature about 10° to about 100° C. to establish an equilibrium condition in the solution;
(c) then admixing the solution with an aqueous solution of a water-soluble, heat decomposable compound of a platinum group metal to form a precipitate-free impregnation solution;
(d) contacting the resulting impregnation solution with a porous, high surface area carrier material at impregnation conditions; and thereafter
(e) drying and calcining the resulting impregnated carrier material to produce the composite.

11. The process of claim 10 further characterized in that said resultant solution is heated in step (b) to about 70° C. for about 1 to about 5 hours.

12. A method as defined in claim 10 wherein said alcohol is a $C_1$ to $C_{10}$ alcohol.

13. A method as defined in claim 10 wherein said alcohol is ethanol.

14. A method as defined in claim 10 wherein said alcohol is isopropanol.

References Cited
UNITED STATES PATENTS

| | | | |
|---|---|---|---|
| 3,578,584 | 5/1971 | Hayes | 252—441 |
| 3,567,656 | 3/1971 | Mitsche | 252—466 |
| 2,906,700 | 9/1959 | Stine et al. | 208—138 |
| 2,906,701 | 9/1959 | Stine et al. | 208—138 |
| 3,617,510 | 11/1971 | Hayes | 252—441 |
| 3,644,198 | 2/1972 | Wilhelm | 252—472 |
| 3,645,888 | 2/1972 | Hayes | 252—466 PT |
| 3,660,309 | 5/1972 | Hayes et al. | 252—442 |
| 3,702,293 | 11/1972 | Hayes et al. | 208—139 |
| 3,705,111 | 12/1972 | Wilhelm | 252—439 |

OTHER REFERENCES

Recveil Trav. Chim. 81 (1962), pp. 475–479, "Alkoxy-chlorogermanes" by R. M. Pike et al.

DANIEL E. NYMAN, Primary Examiner

P. E. KOHOPKA, Assistant Examiner

U.S. Cl. X.R.

252—442, 472; 260—429 R; 208—139